US010667180B2

(12) United States Patent
Hurd et al.

(10) Patent No.: US 10,667,180 B2
(45) Date of Patent: May 26, 2020

(54) METHODS AND DEVICES FOR MANAGING ACCESS PRIORITY OF A WIRELESS DEVICE

(71) Applicant: Telefonaktiebolaget LM Ericsson (publ), Stockholm (SE)

(72) Inventors: Magnus Hurd, Stockholm (SE); Aldo Bolle, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/314,712

(22) PCT Filed: Jul. 5, 2016

(86) PCT No.: PCT/EP2016/065865
§ 371 (c)(1),
(2) Date: Jan. 2, 2019

(87) PCT Pub. No.: WO2018/006948
PCT Pub. Date: Jan. 11, 2018

(65) Prior Publication Data
US 2019/0253934 A1  Aug. 15, 2019

(51) Int. Cl.
*H04W 88/08* (2009.01)
*H04W 28/24* (2009.01)
(Continued)

(52) U.S. Cl.
CPC ....... *H04W 28/24* (2013.01); *H04W 72/0433* (2013.01); *H04W 74/006* (2013.01)

(58) Field of Classification Search
None
See application file for complete search history.

(56) References Cited

U.S. PATENT DOCUMENTS 9,204,332 B2 * 12/2015 Chaudhuri ........ H04W 28/0268
2009/0067372 A1 * 3/2009 Shah ....................... H04L 47/10
370/328
(Continued)

FOREIGN PATENT DOCUMENTS

WO   WO 2014/148990 A1   9/2014

OTHER PUBLICATIONS

International Search Report and Written Opinion of the International Searching Authority for International Application No. PCT/EP2016/065865 dated Mar. 20, 2017.
(Continued)

*Primary Examiner* — Ayanah S George
(74) *Attorney, Agent, or Firm* — Sage Patent Group

(57) ABSTRACT

Embodiments herein relate to methods and devices for handling access priority of a wireless device in a wireless network. In particular, embodiments herein relate to a method performed by a wireless network access node for managing/handling access priority associated with a wireless device, which wireless device is requesting access to the wireless network is provided. The method comprises receiving from a mobility management node a message comprising Quality of Service, QoS, information associated with the wireless device; determining access priority related information associated with the wireless device based on the received QoS information; and transmitting the access priority related information associated with the wireless device to the wireless device. Further, embodiments herein relate to corresponding methods for handling access priority associated with a wireless device performed in a wireless device, and in a wireless network, respectively.

31 Claims, 7 Drawing Sheets

(51) Int. Cl.
*H04W 74/00* (2009.01)
*H04W 72/04* (2009.01)

(56) References Cited

U.S. PATENT DOCUMENTS

2013/0117092 A1* 5/2013 Cai .................. H04L 12/14
                                                  705/14.31
2015/0003435 A1* 1/2015 Horn ................ H04W 28/24
                                                  370/338

OTHER PUBLICATIONS

3GPP TS 23.401, V14.0.0, "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 14)," Jun. 2016, 374 pages.
3GPP TR 23.720, V13.0.0, "3$^{rd}$ Generation Partnership Project; Technical Specification Group Services and System Aspects; Study on architecture enhancements for Cellular Internet of Things (Release 13)," Mar. 2016, 94 pages.
3GPP TS 36.331, V13.2.0, "3$^{rd}$ Generation Partnership Project; Technical Specification Group Radio Access Network; Evolved Universal Terrestrial Radio Access (E-UTRA); Radio Resource Control (RRC); Protocol specification (Release 13)," Jun. 2016, 623 pages.
3GPP TR 23.799, V0.5.0, "3$^{rd}$ Generation Partnership Project; Technical Specification Group Services and System Aspects; Study on Architecture for Next Generation System (Release 14)," May 2016, 178 pages.

* cited by examiner

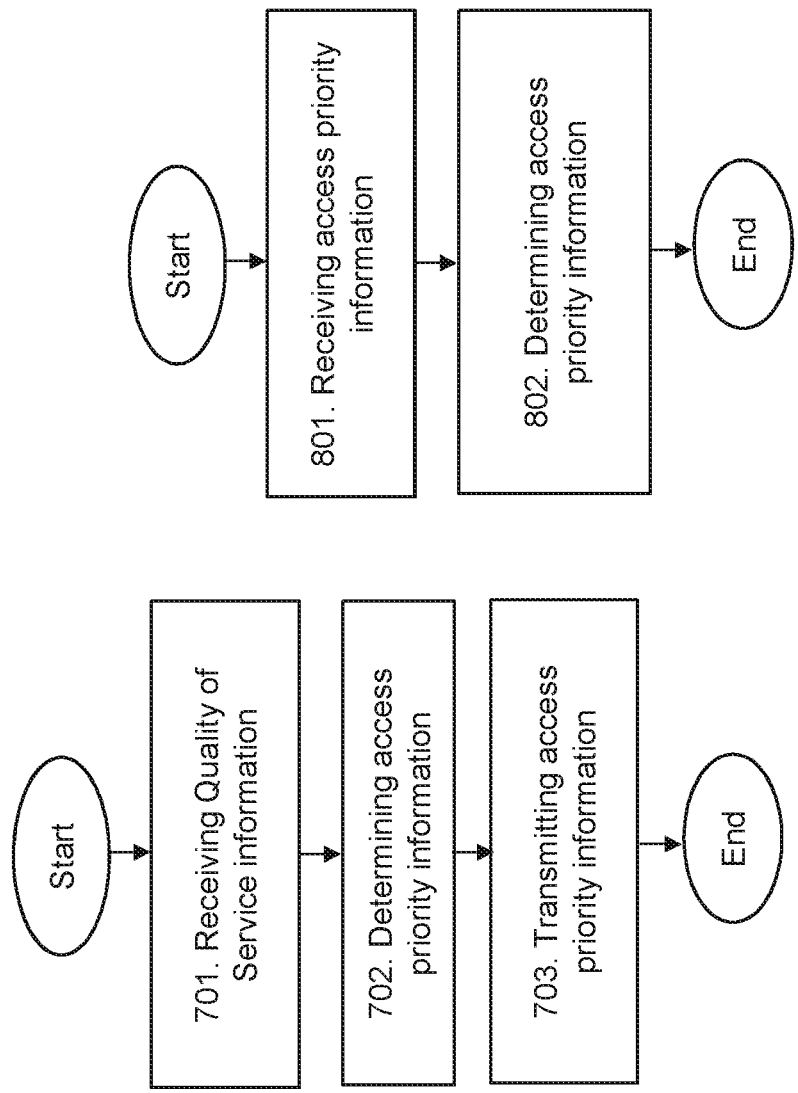

METHODS AND DEVICES FOR MANAGING ACCESS PRIORITY OF A WIRELESS DEVICE

CROSS REFERENCE TO RELATED APPLICATIONS

This application is a 35 U.S.C. § 371 national stage application of PCT International Application No. PCT/EP2016/065865, filed on Jul. 5, 2016, the disclosure and content of which is incorporated by reference herein in its entirety.

TECHNICAL FIELD

Embodiments herein relate to methods and devices for managing/handling access priority of a wireless device in a wireless network. In particular, embodiments herein relate to methods for handling access priority associated with a wireless device performed in a wireless device, in a wireless network access node, an in a wireless network, respectively. Further, the embodiments herein relate to a corresponding wireless device, a corresponding wireless network access, and a corresponding wireless network system, respectively.

BACKGROUND

In a wireless network or a radio communications network, wireless devices, also known as mobile stations, terminals and/or user equipments, UEs, communicate via a Radio Access Network, RAN, with one or more core networks. The radio access network covers a geographical area which may be divided into cell areas, with each cell area being served by a base station, e.g. a wireless access network node or a radio base station, RBS, node, which in some networks may also be called, for example, a "eNB", "NodeB" or "eNodeB". A cell may be a geographical area where radio coverage is provided by the radio base station at a base station site or an antenna site in case the antenna and the radio base station are not collocated. Each cell may be identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipment within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipment. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat rather than hierarchical architecture comprising radio base station nodes without reporting to RNCs.

In a 3GPP system and in particular in an EPC/LTE system, access control and Radio Resource Management, RRM, are two mechanisms used in a sequence to prioritize a UE ability to send and receive data over the radio interface. In both mechanisms the success of the wireless device request depends on the load in RAN, specifically in the eNB, and the priority given when handling the UE request.

The Access Control mechanism refers to the ability to control how the UE to connect to the wireless access network node. This involves, for example in LTE access networks, a UE transmitting a Radio Resource Control, RRC, connection request to the eNB as part of the RRC connection establishment procedure. Examples of the methods used for access control are Access Class Barring, ACB, Extended Access Class Barring, EAB, and Application specific Congestion control for Data Communication, ACDC. In general, the priority used in the methods for access control is represented by access classes, such as in ACB and EAB, or by categories, such as in ACDC, both hardcoded in the USIM card holding subscriber information.

Once the UE has connected to the wireless access network node and gained access, RRM in RAN based on authorized QoS, e.g. Scheduling and Admission Control, refers to the decisions made by eNB, to serve the UE based on available RAN resources.

In 3GPP LTE Release 13, so called Suspend/Resume procedures are specified. The procedures provide for the RAN to instruct the UE to go to idle mode while storing the Contexts in the UE and in RAN. The UE requests to resume the Context, if it desires to transmit or if it is paged. Thus, RAN may execute admission control at the Resume request of the UE based on the stored context priority derived from the detailed QoS profiles authorized by the Core Network.

For instance, at an Attach or at a Service Request, access class barring (or similar mechanism) precedes a connection establishment. However, for access class barring, prioritization is not based on the authorized QoS of the core network. For the eNB on the other hand a detailed QoS profile is not available until the later phases of the procedures, which results in a reservation of the RAN resources until a full examination of the QoS info based on the Initial Context Setup message is completed. This can potentially end up with a release of the UE, if request is less important. Since the success of a UE request depends on a positive outcome of both access and admission control, in a high load situation, a UE may be prioritized during access control and later be denied to be admitted to resources by admission control, leading to a temporary waste of the resources. Alternatively, a UE that would be admitted by admission control may not be prioritized during access control, resulting in a poor quality of experience for prioritized connections.

Therefore, there is a need for improved handling/management of wireless network resources.

SUMMARY

It is an object of embodiments herein to at least alleviate the above mentioned problems by providing improved handling/management of wireless network resources when a wireless device is attempting to access or is accessing the wireless network.

According to a first aspect of embodiments herein, the object is achieved by a method performed by/in a wireless network access node for managing/handling access priority associated with a wireless device, which wireless device is requesting access to the wireless network. The method comprising receiving from a mobility management node a message comprising Quality of Service, QoS, information associated with the wireless device; obtaining access priority related information associated with the wireless device based on the received QoS information; and transmitting the access priority related information associated with the wireless device to the wireless device.

Thus, the priority for the Access/barring mechanisms may be aligned or correlated with the QoS authorized for the connections of the wireless device, which is advantageous since resources are not allocated in vain and the wireless device which tries to access the network is given the priority it has right to and needs.

Since the access priority associated with and indicated to the wireless device is based on the active bearers QoS profile/information retrieved from the core network, the embodiments here in result in an alignment of the priority in core, RAN and UE in both Access control and any other RRM mechanism. A further advantage is that higher degree of alignment between the subscriber/service differentiation defined by the core network and the subscriber/service differentiation enforced in access class barring and in admission control. A still further advantage is that the embodiments here in allow for updating access classes in UE based on bearer QoS profiles in eNB, which may be authorized by the core network.

Still an advantage is that by handling/managing an access priority in line with embodiments herein, the priority associated with the wireless device for both access and admission control may be aligned. Thus, the current problems in a high load situation where a wireless device being prioritized during access control but may later be denied to be admitted to resources by admission control, leading to a temporary waste of the resources may be alleviated. Still further, the problems with a wireless device that would be admitted by admission control may not be prioritized during access control, resulting in a poor quality of experience for prioritized connections may also be alleviated.

Further advantages may be derived from the dependent claims.

The access priority related information associated with the wireless device may be in form of a priority or access class associated with the wireless device. Therefore, the terms may be used interchangeably herein. Further, associated with is intended to mean that the access priority related information is either directly related to the wireless device, or to a subscription associated with the wireless device.

According to a second aspect of embodiments herein, the object is achieved by a wireless network access node configured to perform the method above.

According to a third aspect of embodiments herein, the object is achieved by a method in a wireless device A method performed by a wireless device for managing/handling an access priority of a wireless device, which wireless device is requesting access to the wireless network. The method comprising receiving from a wireless network access node information comprising an access priority of the wireless device, wherein the information is determined at the wireless network access node based on Quality of Service information relating to the wireless device received in a message from a mobility management node.

According to a fourth aspect of embodiments herein, the object is achieved by a wireless device for enabling the method above.

According to a fifth aspect of embodiments herein, the object is achieved by a method in a wireless network for managing/handling access priority associated with a wireless device, which wireless device is requesting access to the wireless network. The method comprising transmitting from a mobility management node a message comprising Quality of Service, QoS, information associated with the wireless device to a wireless network access node; obtaining at the wireless network access node access priority related information associated with the wireless device based on the received QoS information; and transmitting the access priority related information associated with the wireless device to the wireless device.

According to a sixth aspect of embodiments herein, the object is achieved by a wireless network system configured to perform the method above.

According to a seventh aspect of embodiments herein, the object is achieved by a computer programs, comprising instructions which, when executed on at least one processor, cause the at least one processor to carry out the methods described above.

According to an eight aspect of embodiments herein, the object is achieved by a carrier containing the computer program described above, wherein the carrier is one of an electronic signal, optical signal, radio signal, or computer readable storage medium.

BRIEF DESCRIPTION OF THE DRAWINGS

Embodiments will now be described in more detail in relation to the enclosed drawings.

FIG. 7 is a flowchart depicting embodiments of a method in a wireless network access node, FIG. 8 is a flowchart depicting embodiments of a method in a wireless device.

DETAILED DESCRIPTION

Figure 1:
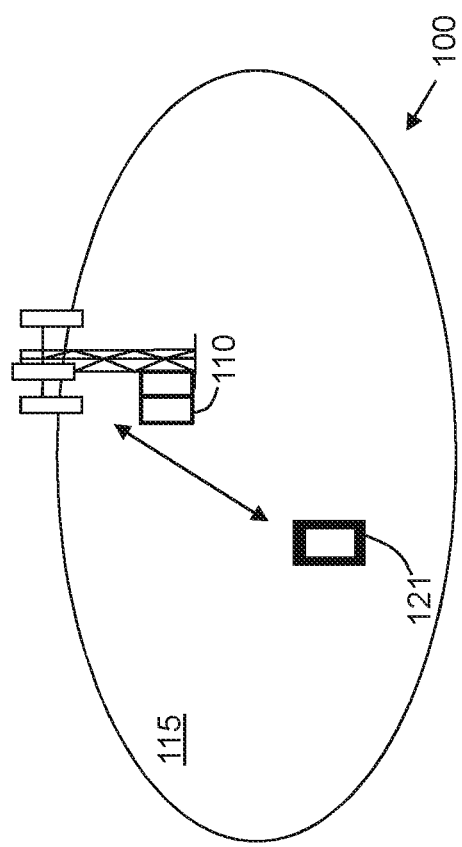
FIG. 1 is a schematic illustration of a wireless device in a wireless network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a wireless access network 100, exemplified as a radio communication network, in which embodiments herein may be implemented. Although illustrated in the example of FIG. 1 as an LTE network, the radio communications network 100 should not be considered limited to this specific wireless communications technology.

The radio communications system 100 comprises a wireless network access node or radio access node 110. The wireless network access node 110 may e.g. be an eNodeB (eNB), or a Home Node B, a Home eNode B, femto Base Station (BS), pico BS or any other network unit capable to serve wireless devices in the radio communications network 100. The wireless network access node 110 may also be e.g. a base station controller, a network controller, a relay node, a repeater, an access point, a radio access point, a Remote Radio Unit (RRU) or a Remote Radio Head (RRH).

The wireless network access node 110 is configured to be connected to and form part of an Enhanced-Universal Terrestrial Radio Access Network, E-UTRAN, of the radio communications network 100.

In the example shown in FIG. 1, the wireless network access node 110 is configured to provide wireless radio coverage to wireless devices in a cell 115. A cell may be seen as a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell may be identified by an identity within the local radio area, which is broadcast in the cell. Another identity identifying each cell uniquely in the whole radio communication network 100 may also be broadcasted in the cell. The wireless network access node 110 communicates over the air or radio interface operating on radio frequencies with wireless devices within range of the wireless network access node 110.

Furthermore, in the example of FIG. 1, a wireless device 121 is located within the cell 115. The wireless device 121 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, a UE with D2D capability, Customer Premises Equipment (CPE), or any other radio network unit capable to communicate over a radio link in the radio communications network 100. The wireless device 121 may also be a Machine-to-Machine, M2M, communication device that serves as a data communication modem or is built into equipment communicating data with a server without human interaction.

The wireless device 121 is configured to communicate within the radio communications network 100 via the wireless network access node 110 over a radio link, shown by fully drawn arrows, when present in the cell 115 served by the wireless network access node 110.

Although embodiments below are described with reference to the example of FIG. 1, this example should not be construed as limiting to the embodiments herein, but merely as an example made for illustrative purposes.

Figure 2:
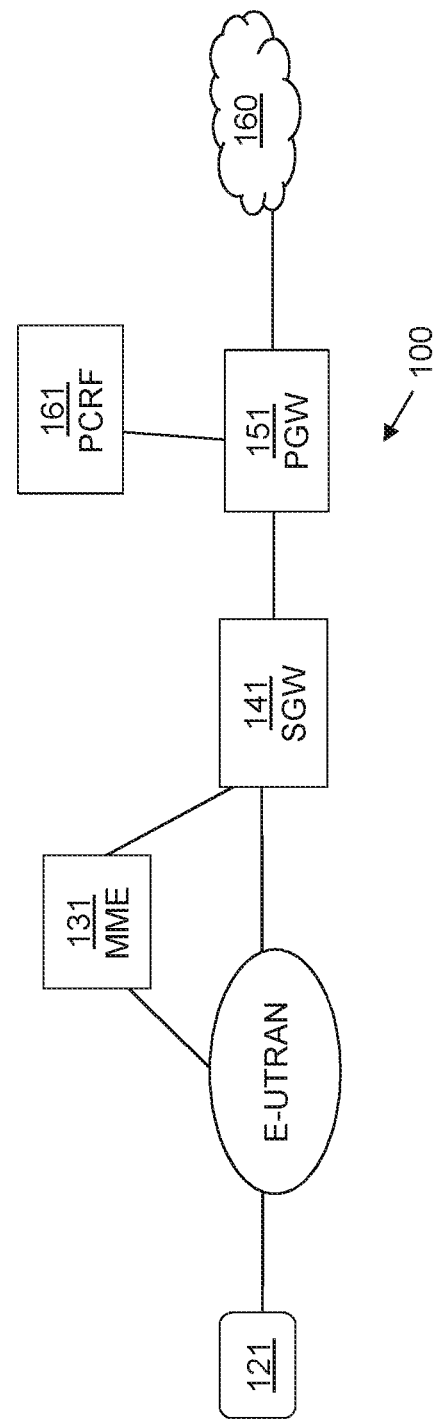
FIG. 2 is a schematic block diagram illustrating a wireless device in a wireless network exemplified as a LTE/EPC network.

FIG. 2 is a schematic block diagram illustrating a wireless device in a wireless network exemplified as an LTE/EPC network. In the example embodiment of FIG. 2, a gateway node provides connectivity for the wireless device 121 of the communications network 110 to one or more external Packet Data Networks, PDNs, e.g. the Internet or similar, and nodes or similar in the external network, e.g. such as the external network node 160 which will be discussed further below. The network gateway node may e.g. be a Gateway GPRS Support Node, GGSN, or a PDN Gateway, PGW, 151. With reference to FIG. 2, the RAN or E-UTRAN comprises the wireless network access node 110 and the wireless device 121, while the core network of the radio communications network 100 comprises such nodes as a Mobility Management Entity, MME, 131, a Serving Gateway SGW 141, the PGW 151 and a Policy and Charging Rules Function, PCRF, 161. The PGW 151 may transceive, i.e. receive and transmit, downlink, DL, and uplink, UL, data packets of the ongoing data session A between an external network node 160 and the first wireless device 121. The external network node 160 may e.g. be a Public Safety Application server or an internet server or similar. The PGW 151 may use a Packet Data Network, PDN, connection towards the first wireless device 121. The PGW 151 may communicate with the external network node 160 over a SGi interface.

A mobility management node, exemplified as a MME 131 serves a wireless device (e.g. such as the wireless device 121) to provide different functions, such as, Non-Access Stratum, NAS, signalling, EPS bearer management, roaming functions, etc.

In a 3GPP system and in particular in an EPC/LTE system, access control and Radio Resource Management, RRM, are two mechanisms used in a sequence to prioritize a UE ability to send and receive data over the radio interface. In both mechanisms the success of the wireless device request depends on the load in RAN, specifically in the eNB, and the priority given when handling the UE request.

In general, RRM in RAN based on authorized QoS (e. g. scheduling and Admission Control) refers to the decisions made by eNB, when the UE request has reached the eNB, to serve the UE based on available RAN resources.

Typically, Admission Control at RRC Connection Request in LTE has been suffering from lack of QoS information describing subscriber/service differentiation. At an Attach or at Service Request, for instance, just a simple establishmentCause value has been included in a RRC Connection Request message. On the other hand, the Core Network authorizes a detailed QoS profile per E-RAB that is available in the later phases of the procedures (see FIG. 1). The late availability of the authorized QoS in the eNB results in a reservation of the RAN resources until a full examination of the QoS info based on the Initial Context Setup message is completed. This can potentially end up with a release if request is less important.

Figure 3:
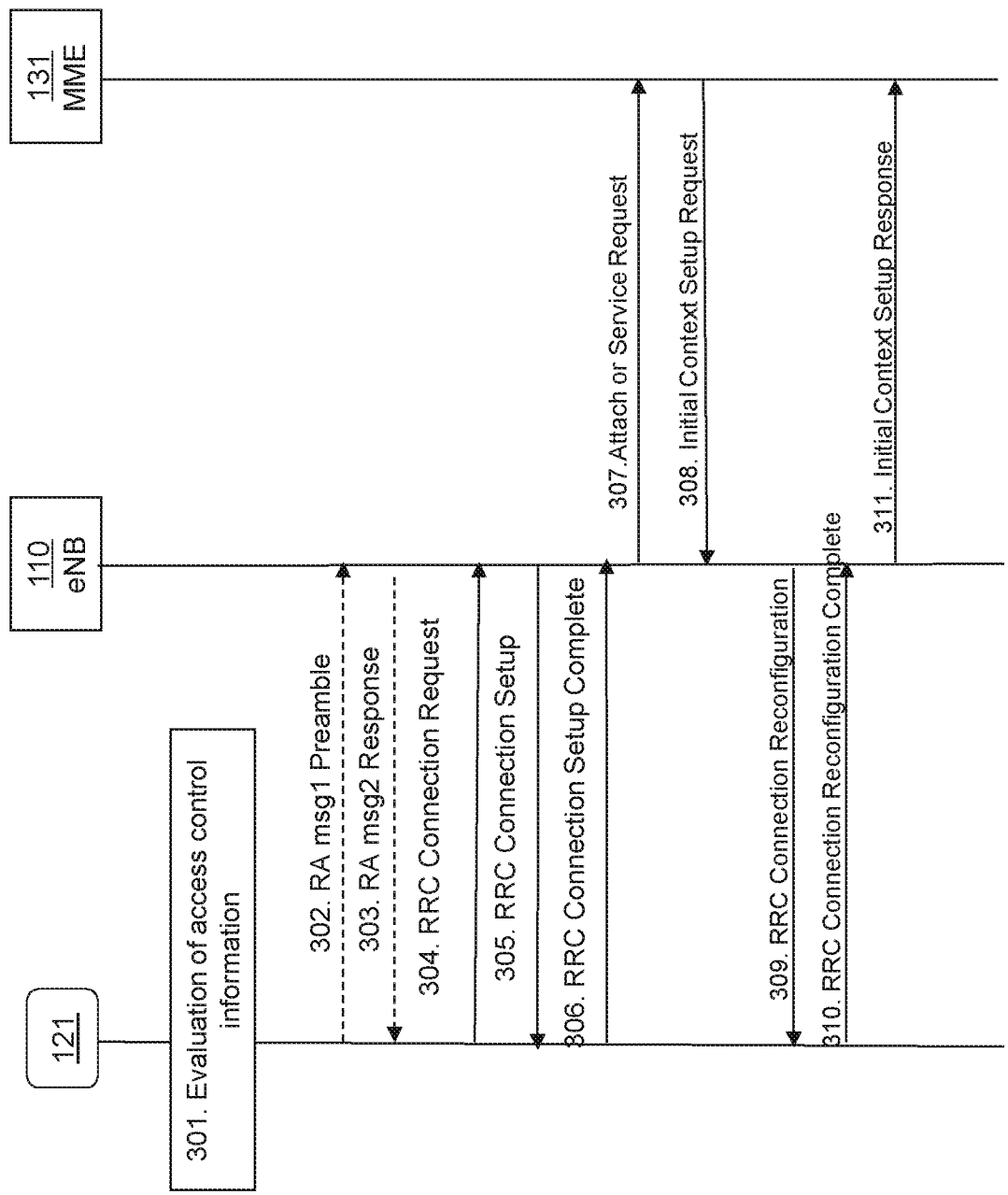
FIG. 3 is a signalling diagram illustrating parts of an attach request procedure in LTE/EPC network.

FIG. 3 is a simplified, illustrated example of actions or operations which may be taken by the involved nodes and a wireless device, or UE, at a network attach procedure in an LTE/EPC network. The network attach procedure is described more in detail in 3GPP TS 23.401 General Packet Radio Service (GPRS) enhancements for Evolved Universal Terrestrial Radio Access Network (E-UTRAN) access.

Initially, when the wireless device has not yet registered in the network there is no context associated with the wireless device in the RAN. This context contains parameters describing how the data transmission shall happen over air interface resources; the priority of radio bearers is one such parameter. The context, i.e. the information associated with the wireless device is registered by means of the network attach procedure, the actions of which being relevant for the registration of the context are illustrated in FIG. 3. The attach procedure comprises also other signaling, also in between signaling shown in FIG. 3, excluded herein for the sake of clarity. As part of the initial attach an RRC Connection Request is sent from the wireless device to the eNB.

Action 301

In this action, the wireless device 121 evaluates access control information based on hardcoded information in the USIM.

Action 302

In this action, the wireless device 121 transmits 302 a RA msg1 Preamble message to the eNB 110.

Action 303

In this action, the eNB 110 transmits 303 RA msg2 Response message to the wireless device 121.

Action 304

In this action, the wireless device transmits 604 a RRC Connection Request to the eNB 110. The sending of the Connection request may be preceded by access control. Then the device can evaluate the access control information based on hardcoded information in the USIM associated with the wireless device 121 as an input to the access class barring mechanisms.

Action 305

In this action, the eNB 110 transmits 305 a RRC Connection Set up message to the wireless device 121.

Action 306

Upon the RRC Connection Setup Complete message, the encryption is started and UL traffic enabled.

Action 307

In this action, the eNB 110 transmit a 307 Attach or Service Request.

Action 308

In this action, the mobility management entity, MME, 131 transmits an Initial Context Setup Request, also comprising an Attach Accept message, to the wireless network access node 110, exemplified as an eNB. The initial Context Setup Request is a control message. By transmitting the Initial Context Setup Request, the MME may provide the eNB 110 with QoS profiles per E-RAB. Those QoS profiles comprises the QoS Class Identifier, QCI and the Allocation and Retention Priority, ARP. The QoS profiles represent an expected differentiated treatment of subscriber/service associate with the wireless device as authorized by the core network.

Once the Initial Context Setup request is received, the eNB is aware of the EPS bearer parameters, which comprises the QoS profiles/parameters.

After the Attach Accept message and once the wireless device has obtained a PDN Address, the UE can then send uplink, UL, data packets towards the eNB which will then be tunnelled to the Serving GW and PDN GW.

Action 309

The eNB 110 transmits an RRC Connection Reconfiguration message, comprising the EPS Radio Bearer Identity, to the wireless device 121. An Attach Accept message may also be transmitted along to the wireless device 121. The wireless device 121 stores the QoS Negotiated, Radio Priority, Packet Flow Id and TI, which it received in the Session Management Request, for use when accessing via GERAN or UTRAN. The wireless device 121 may provide EPS Bearer QoS parameters to the application handling the traffic flow(s). The application usage of the EPS Bearer QoS is implementation dependent. The wireless device 121 may not reject the RRC Connection Reconfiguration on the basis of the EPS Bearer QoS parameters.

Action 310

Upon receiving the RRC Connection Reconfiguration message, the wireless device 121 transmits an RRC Connection Reconfiguration Complete message to the eNB 110.

Action 311

In this action, the eNB 110 transmits an Initial Context Response message to the MME 131. This Initial Context Response message comprises the TEID of the eNB and the address of the eNB used for downlink, DL, data.

Alternatively, either The MME shall be prepared to receive this message either before or after the Attach Complete message.

In general, the Access Control mechanism mentioned in action 301-304 refers to the ability to control the possibility for the wireless device 121 to connect to the wireless network. This involves a wireless device 121 transmitting an RRC connection request to the eNB 110 as part of the RRC connection establishment procedure. Examples of the methods used for access control are Access Class Barring, ACB, Extended Access Class Barring, EAB, and Application specific Congestion control for Data Communication, ACDC. The priority associated with the wireless device 121 used in methods for access control is generally represented by access classes for ACB and EAB; or by categories for ACDC that is hardcoded in the USIM.

At the RRC connection establishment procedure, the wireless device 121 relies on the access classes configured into the USIM card. Priority associated with the wireless device 121 in access control is generally governed by the Access Class Barring and in admission by the establishmentCause provided by the wireless device 121.

In the Initial Context Setup Request, the MME provides the eNB with QoS profiles per E-RAB. Those QoS profiles include the QoS Class Identifier (QCI) and the Allocation and Retention Priority, ARP. All in all, these QoS profiles represent an expected differentiated treatment of subscriber/service as authorized by the core network.

Once the Initial Context Setup request is received, the eNB is aware of the EPS bearer parameters, including the QoS.

Admission Control at RRC Connection Request in LTE has been suffering from lack of QoS information describing subscriber/service differentiation associated with a wireless device 121. At an Attach or at Service Request, for instance, a simple establishmentCause value has been included in a RRC Connection Request message. On the other hand, the Core Network authorizes a detailed QoS profile per E-RAB that is available in the later phases of the procedures. The late availability of the authorized QoS in the eNB results in a reservation of the RAN resources until a full examination of the QoS info based on the Initial Context Setup message is completed. This can potentially end up with a release if the request is less important.

Figure 4:
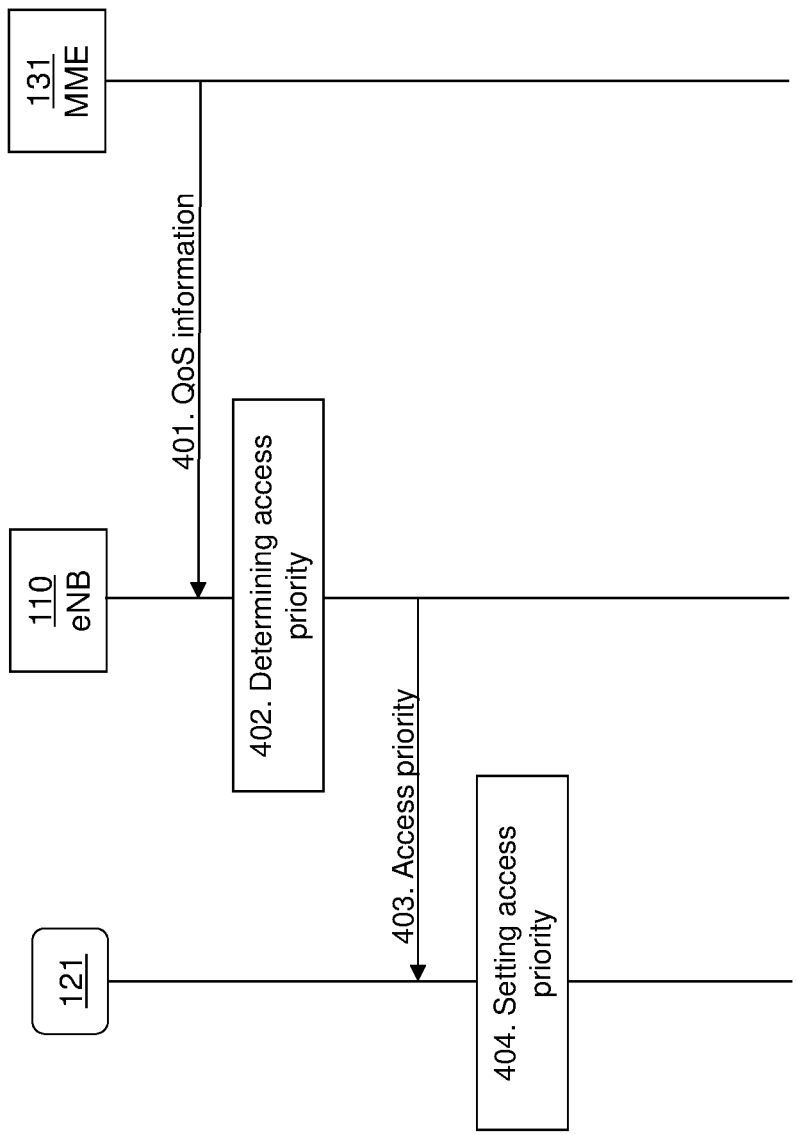
FIG. 4 is a signalling diagram of an illustrating an example of an embodiment of a method for managing access priority associated with a wireless device in a wireless network.

FIG. 4 illustrates schematically signalling for an exemplary embodiment of a method for managing access priority relating to a wireless device 121, which wireless device is requesting access to the network. FIG. 4 is a simplified, illustrated example of actions or operations, some or all of which may be performed by the involved nodes and the wireless device 121 for improving the handling or managing of access priority associated with a wireless device 121.

Action 401

The wireless network access node 110, such as an eNB, receives 401 from a mobility management node 131, such as a MME, a message comprising Quality of Service, QoS, information associated with the wireless device 121.

Action 402

In this action, the wireless network access node 110, obtains/determines/derives 402 access priority related information associated with the wireless device 121, or simply a priority associated with the wireless device 121, based on the received QoS information. The access priority related information associated with the wireless device 121 may be in form of a priority or access class associated with the wireless device 121. Therefore, the terms may be used interchangeably herein.

Action 403

In this action, the wireless network access node transmits 403 the access priority related information associated with the wireless device 121 to the wireless device 121.

Action 404

In this action, the wireless device 121 stores the access priority related information associated with the wireless device as default in a subsequent access control mechanism, such as access class barring, resume request, or connection request.

The access priority related information may be a priority or an access class associated with the wireless device 121. By transmitting the access priority related information to the wireless device, the wireless device may set it as a default access priority and may thus be used for any future use of access classes used in access class barring, overriding as such the information stored on the USIM. By that, a priority associated with the wireless device 121 authorized by the core network may be used for access and admission control.

In action 402, several methods for calculating/deriving/determining/obtaining the access priority related information associated with a wireless device 121 may be used. One possibility is to give highest access priority on the most important ARP Priority level of the UE context QoS profiles. Alternatively, or additionally, the highest priority maybe given to the most important ARP Priority level of the UE context QoS profiles with Pre-emption vulnerability set to Not pre-emptable. Still alternatively, the access priority maybe based on no calculation at all, and instead base the access priority related information associated with a wireless device 121 on priority per EPS bearer. In such a case, the wireless device 121 uses the priority per EPS bearer to assess how important the service is.

The access priority related information associated with a wireless device 121 may be obtained/determined similarly or identically for access class barring and any other RRM mechanism in RAN (like admission control). Thus, the wireless device 121 may use the access priority related information to select an access class which maybe different than configured on its USIM card. Likewise, admission control and scheduling may use the same access priority related information, or simply priority, associated with the wireless device 121 to differentiate service at congestion.

The access priority related information associated with the wireless device 121, in form of a priority or access class associated with the wireless device 121, which is obtained based on the QoS profiles associated with the wireless device 121 and may replace or override the access class associated with the wireless device in the USIM, may be used in both the Access Class Barring and Extended Access Class Barring. If instead a priority or access class associated with the wireless device 121 is determined/obtained per bearer, the priority or access class associated with the wireless device may replace the Application mapping to access class configured in the USIM for ACDC.

Figure 5:
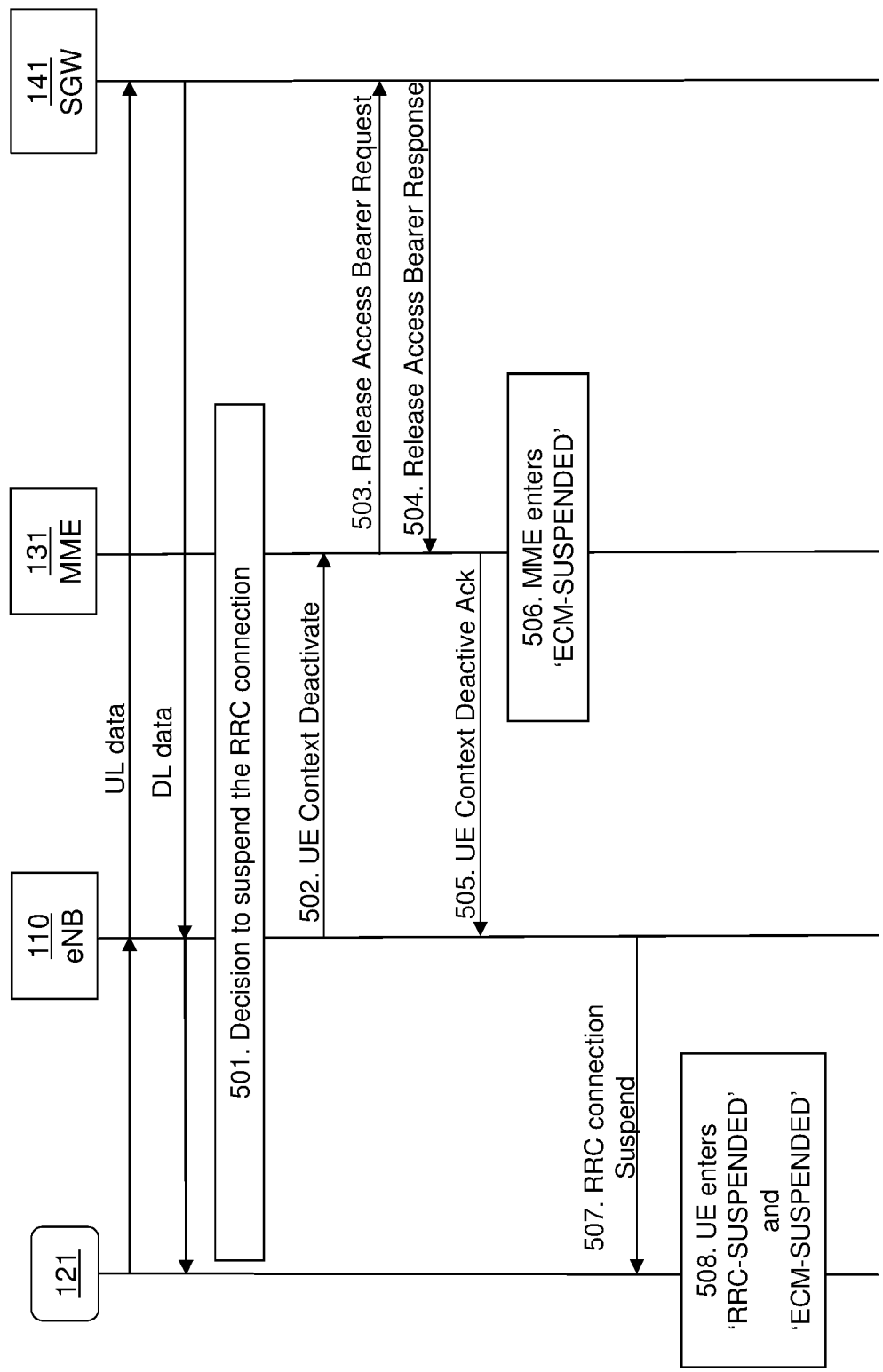
FIG. 5 is a signalling diagram illustrating an example of a suspend mechanism for a wireless device in a wireless network.
Figure 6:
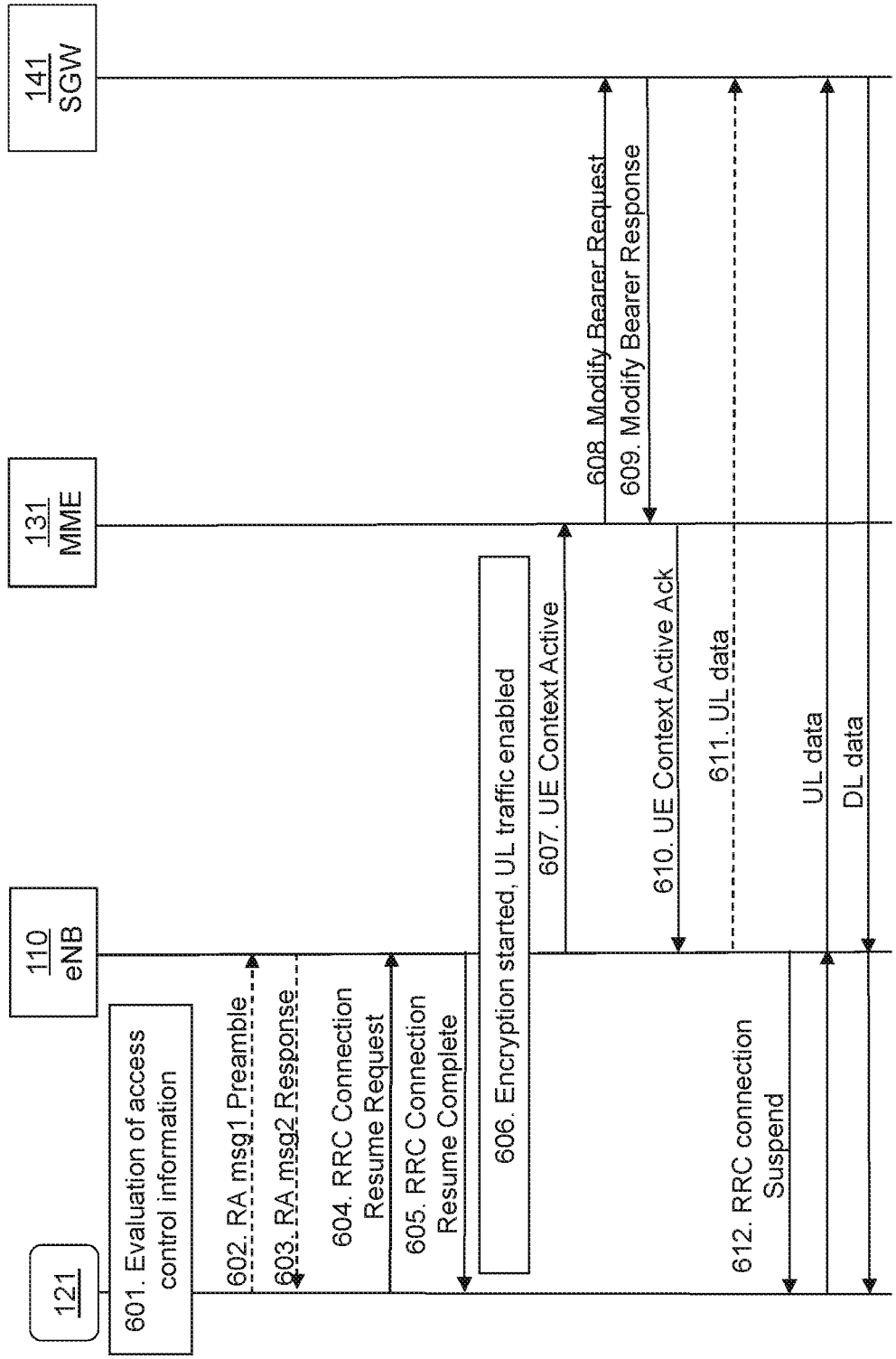
FIG. 6 is a signalling diagram illustrating an example of a resume mechanism for a wireless device in a wireless network.

FIGS. 5 and 6 illustrates schematically signalling for an exemplary embodiment of a method for managing access priority relating to a wireless device 121, which wireless device is requesting access to the network. The signalling in the example in FIGS. 5 and 6 is based on the Suspend/Resume procedures in 3GPP. The procedures are described in more detail in 3GPP TR 23.720 Study on architecture enhancements of cellular systems with support for ultra low complexity and low throughput Internet of Things, and 3GPP TR 36.331 Evolved Universal Terrestrial Radio Access (E-UTRA), radio Resource Control (RRC); Protocol specification. In general, the Suspend/Resume procedures may be seen as a variant of the Idle state is introduced where the wireless device, or UE, contexts are stored in both network access node 110, exemplified as an eNB, and in the wireless device 121. FIG. 5 illustrates the Suspend procedure and FIG. 6 illustrates the Resume procedure.

In the example of FIG. 5 there may be ongoing transmission of UL and/or DL data from the wireless device 121, via the eNB 110, to the gateway node 141, in form of a Serving Gateway, SGW. FIG. 5 is a simplified, illustrated example of actions or operations, some or all of which may be performed by the involved nodes and the wireless device 121 for improving the handling or managing of access priority associated with a wireless device 121 at a Suspend procedure.

Action 501

A decision to suspend the RRC connection of the wireless device 121 is taken.

Action 502

Upon the decision to suspend the RRC connection of the wireless device 121, the eNB 110 transmits 502 a wireless device context deactivate message, for instance in form of an S1-AP UE Ctxt deactivate message, to the mobility management entity, MME, 131.

Action 503

Upon receiving the wireless device context deactivate message, the MME 131 transmits 503 Release Access Bearer Request to the SGW 141.

Action 504

In this action, the SGW 141, transmits 504 a Release Access Bearer Response to the MME 131.

Action 505

Upon receiving the Release Access Bearer Response, the MME 131 transmits 505 a wireless device Context Deactivate Ack message, for instance in form of a S1-AP UE Ctxt Deactive Ack message to the eNB 110.

Action 506

In this action, MME 131 enters 506, a suspended state, such as ECM-SUSPENDED.

Action 507

In this action, the eNB 110 transmits 507 a RRC connection Suspend message to the wireless device 121. I this action also a priority (or access class) associated with the wireless device 121 that reflects the QoS profiles of the wireless device context, or UE context, may be transmitted to the wireless device 121. Alternatively or additionally, more detailed information related to differentiation, e.g. a priority per EPS bearer, may be transmitted to the wireless device 121.

Action 508

Upon receiving the RRC connection Suspend message, the wireless device 121 enters suspended state.

By transmitting priority or access class associated with the wireless device in action 507, the wireless device 121 may consider that priority or access class in any access class barring mechanism based on the bearer that triggered the service request. As will be clear from below, such approach would be suitable in view of a Resume request that also provides information on the bearer triggering the request.

FIG. 6 is a simplified, illustrated example of actions or operations, some or all of which may be performed by the involved nodes and the wireless device 121 for improving the handling or managing of access priority associated with a wireless device 121 at a Resume procedure.

Action 601

In this action, the wireless device 121 evaluates access control information.

Action 602

In this action, the wireless device 121 transmits 602 a RA msg1 Preamble message to the eNB 110.

Action 603

In this action, the eNB 110 transmits 603 RA msg2 Response message to the wireless device 121.

Action 604

In this action, the wireless device transmits 604 a RRC Connection Resume Request to the eNB 110. The sending of the Resume request may be preceded by access control. Then the device can use the previously received priority, or access class, associated with the wireless device 121 as an input to the access class barring mechanisms.

Action 605

In this action, the eNB 110 transmits 605 a RRC Connection Resume Complete message to the wireless device 121.

Action 606

Upon the RRC Connection Resume Complete message, the encryption is started and UL traffic enabled.

Action 607

The eNB 110 transmits 607 a wireless device Context Active message, such as a S1-AP UE Ctxt Active message, to the MME 131.

Action 608

The MME 131 transmits 608 a Modify Bearer Request to the gateway node 141, in form of a SGW 141.

Action 609

The SGW 141 transmits 609 a Modify Bearer Response to the MME 131.

Action 610

The MME 131 transmits 610 a wireless device Context Active Ack message, for instance in form of a S1-AP UE Ctxt Active Ack message, to the eNB 110.

Action 611

Optionally, the eNB 110 transmits 611 UL data to the serving gateway, SGW, 141.

Action 612

In this action, the eNB 110 transmits 612 a RRC connection Suspend message to the wireless device 121.

In addition to the example embodiments in FIGS. 5 and 6, the eNB 110 may use the RRC Reconfiguration message to also provide the priority, or access class, associated with the wireless device 121 that reflects the QoS profiles of the UE context, if the UE Context and therefore the QoS profiles is known. As has been said in connection to FIG. 4, the priority, or access class, associated with the wireless device may be stored by the wireless device 121, thus overriding the access class otherwise configured into the USIM card and not strictly related to the QoS, or by the core network authorized QoS profiles.

Example of embodiments of methods performed by a wireless network access node 110 for managing/handling access priority associated with a wireless device 121, which wireless device is requesting access to the wireless network, will now be described with reference to the flowchart depicted in FIG. 7. FIG. 7 is a simplified, illustrated example of actions or operations which may be taken by the wireless network access node 110.

Action 701

In this action, the wireless network access node 110 receives Quality of service information associated with the wireless device 121 from a mobility management entity, MME 131. This action may be exemplified by the signaling in Action 401, described with reference to FIG. 4.

Action 702

Here, the wireless network access node 110 obtains/determines/derives access priority related information associated with the wireless device 121 based on the received QoS information. This action is exemplified by the signaling in Actions 402, described with reference to FIG. 4.

Action 703

The wireless network access node 110 transmits the access priority related information associated with the wireless device 121 to the wireless device 121. This action is exemplified by the signaling in Actions 403, 507, 305 described with reference to FIGS. 3-5.

Example of embodiments of methods performed by a wireless device 121 for managing/handling access priority associated with a wireless device 121, which wireless device is requesting access to the wireless network, will now be described with reference to the flowchart depicted in FIG. 8. FIG. 8 is a simplified, illustrated example of actions or operations which may be taken by the wireless device 121.

Action 801

In this action, the wireless device 121 receives from the wireless network access node 110 access priority related information associated with the wireless device 121.

Action 802

Here, the wireless device 121 stores access priority related information associated with the wireless device 121.

Figure 9:
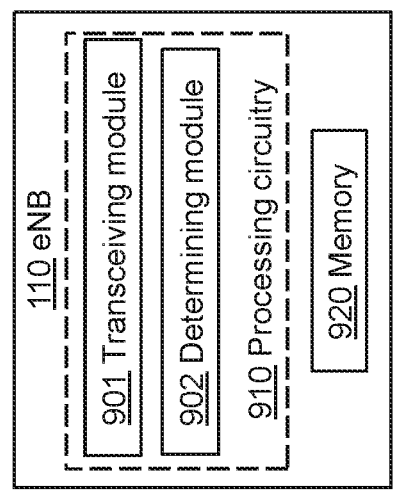
FIG. 9 is a schematic block diagram depicting embodiments of a wireless network access node.

To perform the method actions for managing/handling access priority associated with a wireless device 121, which wireless device is requesting access to the wireless network, the wireless network access node 110, may comprise the following arrangement depicted in FIG. 9. The wireless network access node 110 is configured to manage/handle access priority associated with a wireless device 121, which wireless device is requesting access to the wireless network, managing/handling access priority associated with a wireless device 121, which wireless device is requesting access to the wireless network.

FIG. 9 shows a schematic block diagram of embodiments of the wireless network access node 110. In some embodiments, the wireless network access node 110 may comprise a transceiving module, or transceiver, 901, and an obtaining/determining module or obtainer/determiner 902. In some embodiments, the wireless network access node 110 may comprise a processing circuitry 910, which may also be referred to as processing module, processing unit or processor. The processing circuitry 910 may comprise one or more of the transceiving module 901 and the obtaining/determining module 902, and/or perform the function thereof described below.

The wireless network access node 110 is configured to, e.g. by means of the transceiving module 901, receive QoS related information associated with the wireless device 121 from the MME 131. Also, the wireless network access node 110 is configured to, e.g. by means of the obtaining/determining module 902, obtain/determine access priority related information associated with the wireless device 121 based on the received QoS information. Further, the wireless network access node 110 is configured to, e.g. by means of the transceiving module 901, transmit access priority related information associated with the wireless device 121 based on the received QoS information to a wireless device 121.

Figure 10:
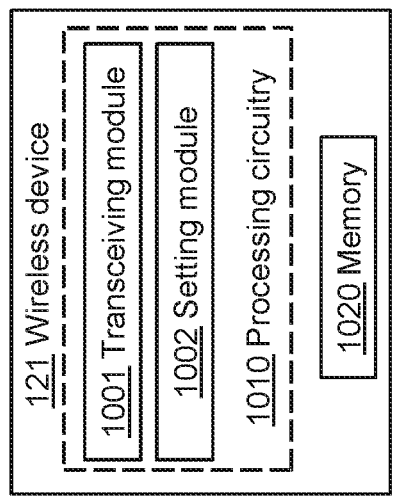
FIG. 10 is a schematic block diagram depicting embodiments of a wireless device.

FIG. 10 shows a schematic block diagram of embodiments of the first wireless device 121. To perform the method actions in the first wireless device 121 for managing/handling access priority associated with a wireless device 121, which wireless device is requesting access to the wireless network, the first wireless device 121 may comprise the following arrangement depicted in FIG. 10. In some embodiments, the first wireless device 121 may comprise a receiving module, or receiver, 1001, and a default setting module 1002. In some embodiments, the first wireless device 121 may comprise a processing circuitry 1010, which may also be referred to as processing module, processing unit or processor. The processing circuitry 1010 may comprise one or more of the receiving module 1001 and storing module 1002, and/or perform the function thereof described below.

The first wireless device 121 is configured to, e.g. by means of the receiving module 1001, receive access priority related information associated with the wireless device 121. Also, the first wireless device 121 is configured to, e.g. by means of the priority setting module 1002, determine that the received the access priority related information associated with the wireless device 121 is to be stored/set.

The embodiments for managing/handling access priority associated with a wireless device 121, which wireless device is requesting access to the wireless network may be implemented through one or more processors, such as, e.g. the processing circuitry 1010 in the first wireless device 121 depicted in FIG. 10, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1010 in the first wireless device 121. The computer program code may e.g. be provided as pure program code in the first wireless device 121 or on a server and downloaded to the first wireless device 121. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The first wireless device 121 may further comprise a memory 1020, which may be referred to or comprise one or more memory modules or units. The memory 1020 may be arranged to be used to store the executable instructions and data to perform the methods described herein when being executed in the first wireless device 121. Those skilled in the art will also appreciate that the processing circuitry 1010 and the memory 1020 described above may refer to a combination of analog and digital circuits, and/or one or more processors configured with software and/or firmware, e.g. stored in the memory 1020, that when executed by the one or more processors such as the processing circuitry 1010 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry 1010 or modules 1001-1002, cause the wireless device 121 to perform the managing/handling access priority associated with the wireless device 121, which wireless device is requesting access to the wireless network. Also, some embodiments may, as described above, further comprise a carrier containing said computer program, wherein the carrier is one of an electronic signal, optical signal, radio signal, or computer readable storage medium.

The embodiments for managing/handling access priority associated with a wireless device 121, which wireless device is requesting access to the wireless network, described above may be implemented through one or more processors, such as, e.g. the processing circuitry 910 in the wireless network access node 110 depicted in FIG. 9, and/or the processing circuitry 1010 in the wireless device 121 depicted in FIG. 10, together with computer program code for performing the functions and actions of the embodiments herein. The program codes mentioned above may also be provided as computer program products, for instance in the form of data carriers carrying computer program code or code means for performing the embodiments herein when being loaded into the respective processing circuitry in the respective nodes. The computer program codes may e.g. be provided as pure program code in the respective node or on a server and downloaded to the respective nodes. The carriers may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Each of the respective nodes 110, 121 may further comprise a memory 920, 1020, respectively, which may be referred to or comprise one or more memory modules or units. The memory 920, 1020 may be arranged to be used to store executable instructions and data to perform the methods described herein when being executed in the respective node. Those skilled in the art will also appreciate that the processing circuitries 910, 1010 and their respective memory 920, 1020 described above may refer to a combination of analog and digital circuits, and/or one or more processors configured with software and/or firmware, e.g. stored in the memories 920, 1020 that when executed by the one or more processors such as the corresponding processing circuitry 910, 1010 perform the method as described in the embodiments above. One or more of these processors, as well as the other digital hardware, may be included in a single application-specific integrated circuit ASIC, or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry or module 910, 1010 cause the at least one processor to carry out the method for managing/handling access priority associated with a wireless device 121, which wireless device is requesting access to the wireless network. Also, some embodiments may, as described above, further comprise a carrier containing said computer program, wherein the carrier is one of an electronic signal, optical signal, radio signal, or computer readable storage medium.

Although the detailed description of the embodiments herein has been exemplified by procedures and messages used in the EPC/LTE framework, the principles for handling priority access related information associated with a wireless device attempting to access a wireless network are also applicable for 5G networks. Thus, similar advantages of aligning access control to Authorized QoS parameters are also applicable for the 5G networks.

The terminology used in the detailed description of the particular embodiments illustrated in the accompanying drawings is not intended to be limiting of the described first and second wireless devices, a wireless network access node or methods therein, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

3GPP 3rd Generation Partnership Project
UMTS Universal Mobile Telecommunications System
UTRAN UMTS terrestrial radio access network
RAN Radio Access Network
HSPA High Speed Packet Access
AAA Access, Authorization, and Accounting
EPC Evolved Packet Core
EPS Evolved Packet System
E-UTRAN Evolved Universal Terrestrial Radio Access Network
E-RAB E-UTRAN Radio Access Bearer
SAE System Architecture Evolution
RNC radio network controller
RRC Radio Resource Control
RRM Radio Resource Management
ePDG Evolved Packet Data Gateway
GW Gateway
ACB Access Class Barring
EAB Extended Access Class Barring
ACDC Application specific Congestion control for Data Communication
HSS Home Subscriber Server
IP Internet Protocol
LTE Long Term Evolution
MME Mobility Management Entity
SGSN Serving GPRS Support Node
UE User Equipment
WLAN Wireless Local Area Network
IP Internet Protocol
PCRF Policy and Charging Rules Function
QoS Quality of Service
QCI QoS Class Identifier
ARP Allocation and Retention Priority
SGW Serving GW
PGW PDN GW
WCDMA Wideband Code Division Multiple Access (CDMA) network,
VMSC Wideband CDMA Mobile Switching Centre
GSM Global System for Mobile Communications

The invention claimed is:

1. A method performed by a wireless network access node for managing access priority associated with a wireless device that is requesting access to a wireless network, the method comprising:
   receiving from a mobility management node a message comprising Quality of Service (QoS) information associated with the wireless device;
   determining access priority related information associated with the wireless device based on the received QoS information; and
   transmitting the access priority related information associated with the wireless device to the wireless device, the access priority related information overrides access priority information stored on a Universal Subscriber Identity Module (USIM) of the wireless device and is arranged to be used in a subsequent access control mechanism that comprises one of an access class barring mechanism, a resume request, and a connection request.

2. The method of claim 1, wherein the message comprising the QoS information associated with the wireless device comprises an Initial Context Setup Request message.

3. The method of claim 1, wherein the message comprising the QoS information associated with the wireless device comprises a Radio Resource Control (RRC) Suspend message.

4. The method of claim 1, wherein the access priority related information associated with the wireless device is transmitted in a Radio Resource Control (RRC) reconfiguration message.

5. The method of claim 1, wherein the access priority related information is one of a priority, an access class, or an Application specific Congestion control for Data Communication (ACDC) category of the wireless device.

6. The method of claim 1, wherein the QoS information is QoS information authorized by a Policy and Charging Rules Function (PCRF).

7. The method of claim 1, wherein the QoS information associated with the wireless device is associated with an E-UTRAN Radio Access Bearer (E-RAB).

8. The method of claim 1, wherein determining the access priority related information associated with the wireless device based on the received QoS information comprises determining the access priority related information associated with the wireless device based on the QoS information of an Evolved Packet System (EPS) bearer.

9. The method of claim 7, wherein the access priority related information associated with the wireless device is determined based on the Allocation and Retention Priority (ARP) of the QoS information associated with the wireless device.

10. The method of claim 9, wherein the ARP of the QoS information associated with the wireless device includes a priority level and pre-emption indicators that indicate whether the E-RAB is pre-emptable or not.

11. A wireless network access node configured to manage access priority associated with a wireless device that is requesting access to a wireless network, the wireless network access node configured to:
receive from a mobility management node a message comprising Quality of Service (QoS) information associated with the wireless device;
determine access priority related information associated with the wireless device based on the received QoS information; and
transmit the access priority related information associated with the wireless device to the wireless device, the access priority related information overrides access priority information stored on a Universal Subscriber Identity Module (USIM) of the wireless device and is arranged to be used in a subsequent access control mechanism that comprises one of an access class barring mechanism, a resume request, and a connection request.

12. The wireless network access node of claim 11, wherein the message comprising the QoS information associated with the wireless device comprises an Initial Context Setup Request message.

13. The wireless network access node of claim 11, wherein the message comprising the QoS information associated with the wireless device comprises a Radio Resource Control (RRC) Suspend message.

14. The wireless network access node of claim 11, wherein the access priority related information associated with the wireless device is transmitted in a Radio Resource Control (RRC) reconfiguration message.

15. The wireless network access node of claim 11, wherein the access priority related information is one of a priority, an access class, or an Application specific Congestion control for Data Communication (ACDC) category of the wireless device.

16. The wireless network access node of claim 11, wherein the QoS information is QoS information authorized by a Policy and Charging Rules Function (PCRF).

17. The wireless network access node of claim 11, wherein the QoS information associated with the wireless device is associated with an E-UTRAN Radio Access Bearer (E-RAB).

18. The wireless network access node of claim 11, further configured to determine the access priority related information associated with the wireless device based on the QoS information of an Evolved Packet System (EPS) bearer.

19. The wireless network access node of claim 11, further configured to determine the access priority related information associated with the wireless device based on the Allocation and Retention Priority (ARP) of the QoS information associated with the wireless device.

20. The wireless network access node of claim 19, wherein the ARP of the QoS information associated with the wireless device includes a priority level and pre-emption indicators that indicate whether the E-RAB is pre-emptable or not.

21. A method performed by a wireless device for managing an access priority of the wireless device the wireless device is requesting access to a wireless network, the method comprising:
receiving, from a wireless network access node, information comprising an access priority of the wireless device, wherein the information is based on Quality of Service (QoS) information associated with the wireless device,
setting the access priority as a default access priority; and
using the access priority related information associated with the wireless device in a subsequent access control mechanism, wherein the subsequent access control mechanism comprises one of an access class barring mechanism, a resume request, or a connection request,
wherein the access priority related information overrides access priority information stored on a Universal Subscriber Identity Module (USIM).

22. The method of claim 21, wherein the message comprising the QoS information associated with the wireless device comprises an Initial Context Setup Request message.

23. The method of claim 21, wherein the message comprising the QoS information associated with the wireless device comprises a Radio Resource Control (RRC) Suspend message.

24. The method of claim 21, wherein receiving, from the wireless network access node, information comprising the access priority of the wireless device comprises receiving the access priority of the wireless device in a Radio Resource Control (RRC) reconfiguration message from the wireless network access node.

25. The method of claim 21, wherein the access priority related information is one of a priority, an access class, or an Application specific Congestion control for Data Communication (ACDC) category of the wireless device.

26. The method of claim 21, wherein the QoS information is QoS information authorized by a Policy and Charging Rules Function (PCRF).

27. The method of claim 21, wherein the QoS information associated with the wireless device is associated with an E-UTRAN Radio Access Bearer (E-RAB).

28. The method of claim 21, wherein the QoS information associated with the wireless device is associated with an Evolved Packet System (EPS) bearer.

29. The method of claim 27, wherein the access priority related information associated with the wireless device is based on the Allocation and Retention Priority (ARP) of the QoS information associated with the wireless device.

30. The method of claim 29, wherein the ARP of the QoS information associated with the wireless device includes a priority level and pre-emption indicators that indicate whether the E-RAB is pre-emptable or not.

31. A wireless network system configured to manage access priority associated with a wireless device that is requesting access to the wireless network, the wireless network system being configured to:
- transmit, from a mobility management node of the wireless network system, a message comprising Quality of Service (QoS) information associated with the wireless device to a wireless network access node;
- obtain, at the wireless network access node of the wireless network system, access priority related information associated with the wireless device based on the received QoS information; and
- transmit, by the wireless network access node, the access priority related information associated with the wireless device to the wireless device, the access priority related information overrides access priority information stored on a Universal Subscriber Identity Module (USIM) of the wireless device and is arranged to be used in a subsequent access control mechanism that comprises one of an access class barring mechanism, a resume request, and a connection request.

* * * * *